(12) United States Patent
Agarwal et al.

(10) Patent No.: US 10,467,537 B2
(45) Date of Patent: Nov. 5, 2019

(54) SYSTEM, METHOD AND APPARATUS FOR AUTOMATIC TOPIC RELEVANT CONTENT FILTERING FROM SOCIAL MEDIA TEXT STREAMS USING WEAK SUPERVISION

(71) Applicant: Conduent Business Services, LLC, Dallas, TX (US)

(72) Inventors: Arvind Agarwal, Webster, NY (US); Cailing Dong, Baltimore, MD (US)

(73) Assignee: CONDUENT BUSINESS SERVICES, LLC, Florham Park, NJ (US)

(*) Notice: Subject to any disclaimer, the term of this patent is extended or adjusted under 35 U.S.C. 154(b) by 488 days.

(21) Appl. No.: 14/877,970

(22) Filed: Oct. 8, 2015

(65) Prior Publication Data
US 2016/0117400 A1 Apr. 28, 2016

Related U.S. Application Data

(60) Provisional application No. 62/067,500, filed on Oct. 23, 2014.

(51) Int. Cl.
*G06N 3/08* (2006.01)
*G06N 5/04* (2006.01)
*G06Q 50/00* (2012.01)
*H04L 12/58* (2006.01)
*G06F 16/95* (2019.01)
*G06N 20/00* (2019.01)

(52) U.S. Cl.
CPC ............ *G06N 5/046* (2013.01); *G06F 16/95* (2019.01); *G06Q 50/01* (2013.01); *H04L 51/12* (2013.01); *H04L 51/32* (2013.01); *G06N 3/08* (2013.01); *G06N 20/00* (2019.01)

(58) Field of Classification Search
None
See application file for complete search history.

(56) References Cited

PUBLICATIONS

Bosch, et al., ScatterBlogs2: Real-Time Monitoring of Microblog Messages Through User-Guided Filtering, IEEE Transactions on Visualization and Computer Graphics, vol. 19, No. 12, Dec. 2013, pp. 2022-2031.*

(Continued)

*Primary Examiner* — Wilbert L Starks
(74) *Attorney, Agent, or Firm* — Budzyn IP Law, LLC

(57) ABSTRACT

Presented are a system, method, and apparatus for automatic topic relevant content filtering from social media text streams using weak supervision. A computing device utilizes heuristic rules allowing topic filtering and a data stream data chunk identifier. A plurality of messages are transmitted as streaming message data from a social media network in real-time. The messages are split into a plurality of data stream data chunks according to the data stream data chunk identifier. A rule-based labeled data set $L_0$ is built from one or more data instances in the first stream data chunk. An initial classifier is built based upon features of $L_0$. The initial classifier is applied to a next data stream data chunk to build a labeled data set $L_1$. A subset of representative instances $S_1$ is selected from labeled data set $L_1$. A first representative classifier $C_1$ is constructed from representative instance $S_1$.

18 Claims, 8 Drawing Sheets

(56) References Cited

PUBLICATIONS

Dong, et al., WS2F: A Weakly Supervised Framework for Data Stream Filtering, 2014 IEEE International Conference on Big Data, 2014, pp. 50-57.*

Bosch, et al., ScatterBlogs2: Real-Time Monitoring of Microblog Messages Through User-Guided Filtering, IEEE Transactions on Visualization and Computer Graphics, vol. 19, No. 12, Dec. 2013, pp. 2022-2031 (Year: 2013).*

Dong, et al., WS2F: A Weakly Supervised Framework for Data Stream Filtering, 2014 IEEE International Conference on Big Data (Big Data), IEEE, Oct. 27-30, 2014, pp. 50-57 (Year: 2014).*

Agarwal, A., et al., "Sentiment Analysis of Twitter Data"; Proceedings of the Workshop on Languages in Social Media, pp. 30-38; Association for Computational Linguistics, 2011.

Attenberg, J., et al., "A Unified Approach to Active Dual Supervision for Labeling Features and Examples"; Machine Learning and Knowledge Discovery in Databases, pp. 40-45; Springer, 2010.

Becker, H., et al., "Learning Similarity Metrics for Event Identification in Social Media"; Proceedings of the Third ACM International Conference on Web Search and Data Mining, pp. 291-300; ACM, 2010.

Bifet, A., et al., "Sentiment Knowledge Discovery in Twitter Streaming Data"; Discovery Science, pp. 1-15; Springer, 2010.

Cataldi, M., et al., "Emerging Topic Detection on Twitter based on Temporal and Social Terms Evaluation"; Proceedings of the Tenth International Workshop on Multimedia Data Mining, p. 4; ACM, 2010.

Diao, Q., et al., "Finding Bursty Topics from Microblogs"; Proceedings of the 50th Annual Meeting of the Association for Computational Linguistics: Long Papers—vol. 1, pp. 536-544; Association for Computational Linguistics, 2012.

Gimpel, K., et al., "Part-of-speech Tagging for Twitter: Annotation, Features, and Experiments"; Proceedings of the 49th Annual Meeting of the Association for Computational Linguistics: Human Language Technologies: Short papers—vol. 2, pp. 42-47; Association for Computational Linguistics, 2011.

Go, A., et al., "Twitter Sentiment Classification using Distant Supervision"; CS224N Project Report, Stanford, pp. 1-12; 2009.

Ounis, I., et al., "Overview of the TREC-2011 Microblog Track"; Proceedings of the 20th Text Retrieval Conference; TREC 2011.

Khan, M. A. H., et al., "An Improved Classification Strategy for Filtering Relevant Tweets Using Bag-of-Word Classifiers"; Journal of Information Processing, vol. 21, No. 3, pp. 507-516; Jul. 2013.

O'Connor, B., et al., "TweetMotif: Exploratory Search and Topic Summarization for Twitter"; Proceedings of the Fourth International AAAI Conference on Weblogs and Social Media; pp. 384-385; Association for the Advancement of Artificial Intelligence, 2010.

Liu X., et al., "Semantic Role Labeling for News Tweets"; Proceedings of the 23rd International Conference on Computational Linguistics, pp. 698-706; Association for Computational Linguistics, 2010.

Melville, P., et al., "Sentiment Analysis of Blogs by Combining Lexical Knowledge with Text Classification"; Proceedings of the 15th ACM SIGKDD International Conference on Knowledge Discovery and Data Mining, pp. 1275-1284; ACM, 2009.

Osborne, M., et al., "Bieber no more: First Story Detection using Twitter and Wikipedia"; Proceedings of the Workshop on Time-Aware Information Access, vol. 12, TAIA'12, Aug. 12-16, 2012.

Petrovic, S., et al., "Streaming First Story Detection with application to Twitter"; Human Language Technologies: The 2010 Annual Conference of the North American Chapter of the Association for Computational Linguistics; pp. 181-189; Association for Computational Linguistics, 2010.

Popescu, A.-M., et al., "Extracting Events and Event Descriptions from Twitter"; Proceedings of the 20th International Conference Companion on World Wide Web, pp. 105-106; ACM, 2011.

Raghavan, H., et al., "An InterActive Algorithm for Asking and Incorporating Feature Feedback into Support Vector Machines"; Proceedings of the 30th Annual International ACM SIGIR Conference on Research and Development in Information Retrieval, pp. 79-86; ACM, 2007.

Raghavan, H., et al., "Active Learning with Feedback on Both Features and Instances"; Journal of Machine Learning Research 7, pp. 1655-1686; 2006.

Rashidi, P., et al., "Ask Me Better Questions: Active Learning Queries Based on Rule Induction"; Proceedings of the 17th ACM SIGKDD International Conference on Knowledge Discovery and Data Mining, pp. 904-912; ACM, 2011.

Ritter, A., et al., "Open Domain Event Extraction from Twitter"; Proceedings of the 18th ACM SIGKDD International Conference on Knowledge Discovery and Data Mining, pp. 1104-1112; ACM, 2012.

Roubos, J. A., et al., "Learning fuzzy classification rules from labeled data"; Information Sciences 150 (1); pp. 77-93; 2003.

Sakaki, T., et al., "Earthquake Shakes Twitter Users: Real-time Event Detection by Social Sensors"; Proceedings of the 19th International Conference on World Wide Web, pp. 851-860, ACM, 2010.

Yang, X., et al., "A Framework for Summarizing and Analyzing Twitter Feeds"; Proceedings of the 18th ACM SIGKDD International Conference on Knowledge Discovery and Data Mining, pp. 370-378; ACM, 2012.

Yang, Y., et al., "A Study on Retrospective and On-Line Event Detection"; Proceedings of the 21st Annual International ACM SIGIR Conference on Research and Development in Information Retrieval, pp. 28-36; ACM, 1998.

Zhao, W. X., et al., "Comparing Twitter and Traditional Media using Topic Models"; Advances in Information Retrieval, pp. 338-349; Springer, 2011.

* cited by examiner

COMPANION WORDS SELECTED BY DIFFERENT MODELS

| ChunkID | A. Common companion words | B. Companion words by *Ensemble Classifier* |
|---|---|---|
| Jan-24 | injured, killed, blast, explosion, 31, dead, bombing, suicide | |
| Jan-25 | blast, news, 35, terrorist, attack, bombing, suicide | dead |
| Jan-26 | modem, revenge, russian, heathrow, girlfriend, patriarch, video | |
| Jan-27 | san, russian, news, bombing | call, police, ap, sings |
| Jan-28 | international | san, gatwick, blvd, domodedovo, terror, attack, bombing |
| Jan-29 | | 1, malaga, blast, shut, investigators, orlando, latest, bombing |
| Jan-30 | san, international | passengers, stream, watch, security, people, live |
| Jan-31 | san | london, news, subject, bomber, introduce, luton, #egypt |
| Feb-01 | nail, protein, dfw, departures | spartak, staff, indianapolis, 312 |
| Feb-02 | | source, russian, victim, dfw, international |
| Feb-03 | | cairns, open, townsville, richmond, international, opening, security |
| Feb-04 | open, d/fw, dfw, international | car, cairo |
| Feb-05 | international | logan, san, boston, terminal, paul |
| Feb-06 | | st., taxi, shuttle, calgary, luton, cut, minneapolis-, pacini |
| Feb-07 | | islamist, san, umarov, ordered, guardian, doku, operators, rebel |
| Feb-08 | | claims, umarov, ordered, leader, doku, rebel, bombing, chechen |

FIG. 6

| ChunkID | C. Companion words by *Initial Classifier* | D. Companion words by *New Classifier* |
|---|---|---|
| Jan-24 | | |
| Jan-25 | | killed |
| Jan-26 | bombing | bombing |
| Jan-27 | call, ap, sings | home, international, today, hotel |
| Jan-28 | san, gatwick, blvd, terror, attack, bombing | 3, parliament, cairo, security, jets, #egypt, private |
| Jan-29 | 1, malaga, blast, shut, orlando, latest, bombing | cairo, speaker, agency, departed, jets, heavy, planes, major, private |
| Jan-30 | cup, diego, sitting, weapon, colorado, three-inch | cup, diego, sitting, weapon, colorado, three-inch |
| Jan-31 | london, curfew, subject, operate, introduce, #egypt, manchester, announcers | mph, kt, international, overcast, winds, vegas, egypt, las |
| Feb-01 | spartak, staff, indianapolis, 312 | icy, officials, today, roads |
| Feb-02 | duluth, russian, victim, domodedovo, dfw, officials, 36, toll | gusting, mph, humidity, kt, luton, northwest, fair, winds |
| Feb-03 | cairns, open, townsville, richmond, opening, international, security, trained | mph, humidity, pressure, kt, county, mb, north, fair, winds |
| Feb-04 | san, columbia, luton, add, dr | san, columbia, luton, add, dr |
| Feb-05 | logan, san, boston, terminal, cape, bos, shannon, ottawa, town | home, flight, time, feb, updated, miami, 2011, security |
| Feb-06 | london, ltn, prentice, luton, hour | |
| Feb-07 | diego, san, killed, international, doku, 24, attack, dhabi | |
| Feb-08 | claims, umarov, ordered, leader, doku, rebel, bombing, chechen | |

FIG. 6
CONTINUED

SELECTED REPRESENTATIVE TWEETS IN EACH STREAM CHUNK

| ChunkID | Selected Top Representative Message |
|---|---|
| Jan-24 | At least 31 killed in Moscow airport suicide bomb (AFP): AFP – A suspected suicide bombing Monday killed at least 31 people and wound ... |
| Jan-25 | 35 killed in Moscow airport suicide bombing (AFP): AFP – A suicide bomber killed at least 35 people and ... |
| Jan-26 | Russian Patriarch Denounces Moscow Airport Bombing – Huffington Post The Hindu Russian Patriarch Denounce ... |
| Jan-27 | Police eye Caucasus suspects in Moscow bombing (AP): AP – A Russian state news agency says investigators pr ... |
| Jan-28 | BS– Domodedovo Airport Bombing: I haven't written anything about the suicide bombing at Moscow's Domodedovo Airp ... |
| Jan-29 | MOSCOW – Russian investigators said Saturday that they have solved this week's Moscow airport bombing and are on ... |
| Jan-30 | Moscow bomber was 20-yr-old from Caucasus: The suicide bomber who killed 35 people and wounded 180 at Moscows l ... |
| Jan-31 | Russian airport bomber identified: the suicide bomber who killed 35 people and wounded 180 at Moscow's largest a ... |
| Feb-01 | alltop: LIVE TV STREAMING Spartak Moscow vs Rosenborg, Spartak Moscow vs Rosenborg live, Spartak Moscow vs Rosen ... |
| Feb-02 | Moscow airport blast victim dies, takes toll to 36: Russian health officials say a victim of the Moscow airport ... |
| Feb-03 | Disregard the Cairns Airport is opening at 2:00 pm. the SMS alerts are sending out old messages. The Cairns Airport will not be opening. |
| Feb-04 | UAE Car Rentals at Dubai Airport and Car Hire in Dubai – Rental car UAE or hiring a rental car service |
| Feb-05 | San Jose airport: City exploring replacing cops with private security to cut costs: Source: |
| Feb-06 | Calgary PACINI COOKS/DISHWASHERS: CALGARY AIRPORT Pacini Ristorante is looking for Dishwashers and experie ... |
| Feb-07 | Islamist rebel Doku Umarov says he ordered Jan 24 attack on Moscow airport that killed 36 [Reuters] #news |
| Feb-08 | Chechen Rebel Leader Claims Moscow Airport Bombing : MOSCOW (AFP) – Chechen rebel chief Doku Umarov claimed resp ... |

FIG. 7

SYSTEM, METHOD AND APPARATUS FOR AUTOMATIC TOPIC RELEVANT CONTENT FILTERING FROM SOCIAL MEDIA TEXT STREAMS USING WEAK SUPERVISION

This application claims the benefit of provisional patent application No. 62/067,500 filed on Oct. 24, 2014.

TECHNICAL FIELD

The present invention is generally related to the field of automated analysis of data from social media networks. More particularly, the invention is related to social media analytics via a system, method, and apparatus for automatically filtering topics and associated messages in a data stream continuously received by a computing device from social media networking software automatically utilizing only weak supervision and delivering information and/or messages associated with a given topic.

BACKGROUND

Twitter®, Facebook®, Plurk®, and any number of other social networking websites are some of the most commonly visited sites accessible via the internet today. Considering the large number of users associated, social networking sites produce and/or process extraordinary amounts of data. Of course, individual visitors to social networking sites do so to review the posts, statuses, pictures, and videos, etc. of other users. While these sites are a rich source of information, only a certain amount of the information generated is relevant towards any given topic. Most of the remainder is personal information, very specific to individual users and not of any interest to an individual or computer seeking certain data. Searching for information is thusly a daunting task when data arrives at such high speed and in such volume.

Accordingly, a need exists for a system, method, and apparatus for automatic topic relevant content filtering from social media text streams using weak supervision.

SUMMARY

The present invention is directed towards a system, method, and apparatus for automatic topic relevant content filtering from social media text streams using only weak supervision. The present invention is particularly well-suited to analysis of social media networking websites involving microblogging. The invention generally functions via monitoring of social media streams, filtering of relevant content, then performing advanced analytics on relevant content in order to provide the above discussed advantages. Filtering of appropriate content may be performed multiple times during execution of the present invention, and may even be one of the initial steps for any end application requiring social media analytics.

A general goal of the invention is to provide dynamic monitoring and processing of data from a continuously transmitted data stream while providing filtered data regarding a topic to a user. Considering the ability of the presently disclosed system, method, and apparatus to function on a continuously transmitted data stream, content relevant to a specific, very recent topic is delivered to the user. The adaptive nature of the invention also allows generation of an event storyline as the event unfolds in real-time, such as a news story and follow-up news stories and public feedback to the series of events. The presently disclosed method, system, and apparatus "learns," i.e. as new data becomes available it is "learned from."

In a first embodiment of the invention, the invention comprises a system, method, and apparatus to filter relevant content from streaming message data streamed across social media networking software to a computing device utilizing a weak supervision strategy. The method, system, or apparatus performs the step of receiving by the computing device one or more heuristic rules for use with a weakly supervised data stream filter utilizing the weak supervision strategy, the one or more heuristic rules allowing topic filtering. A data stream data chunk identifier is utilized by the computing device. The data stream data chunk identifier utilized may identify data chunks according to timestamp, data volume, or by any other means. If timestamp is used, data chunks may be identified according to timeframes such as a minute, an hour, a day, a week, and a month. Any other timeframe may be utilized as well. The advantage presented by different data stream data chunk identifiers is related to various issues such as the bandwidth of an internet connection, the processing power of the computing device considered, the particularities of the social media networking software, etc.

A plurality of messages are received continuously as streaming message data in a data stream from the social media networking software in real-time. The plurality of messages in the data stream are split into a plurality of stream data chunks $D_i$ according to the data stream data chunk identifier. In an embodiment of the invention, the stream data chunks are loaded into memory associated with the computing device. The computing device then builds automatically using at least one of a plurality of heuristic rules a rule-based labeled data set $L_0$ from one or more data instances in the first stream data chunk $D_0$. An initial classifier $C_0$ is constructed based upon one or more features of $L_0$. In an embodiment of the invention, when constructing the initial classifier $C_0$ based on one or more features of $L_0$, the one or more features are specially tailored to the social media networking software. In various embodiments, the social media networking software may be Twitter®, Facebook®, Blogster®, Faceparty®, Google+®, or any other.

The initial classifier $C_0$ is applied to stream data chunk $D_1$ to build automatically labeled data set $L_1$. A subset of representative instances $S_1$ is selected from labeled data set $L_1$. A first representative classifier $C_1$ is constructed from representative instances $S_1$. The first representative classifier $C_1$ is then applied in combination with the initial classifier $C_0$ using one or more combination strategies to stream data chunk $D_2$ to build automatically a labeled data set $L_2$. A subset of representative instances $S_2$ is selected from labeled data set $L_2$. A second representative classifier $C_2$ is constructed from representative instance $S_2$. Execution may continue to execute in a loop as data in the form of stream data chunks $D_i$ is available, or may terminate when further data is not available or at any time. The computing device may also in each iteration build an ensemble classifier $E_i$ that ensembles the initial classifier $C_0$ and a latest built representative classifier $C_i^R$. In each iteration, the computing device may further select a subset of representative instances $S_i$ from labeled data set $L_i$.

In an embodiment of the invention, applying initial classifier $C_0$ or first representative classifier $C_1$ comprises performing a determination of whether one or more words in the plurality of messages are relevant or not-relevant. In such an embodiment, each relevant message is labeled as 1 and each non-relevant message is labeled as 0. The relevant messages may eventually be returned to the user, in a further embodiment.

In a second embodiment of the invention, previous to building automatically by the computing device a rule-based labeled data set $L_0$, the computing device performs additional steps. These additional steps comprise first receiving, by the computing device, a topic for filtering. The computing device determines a stream data chunk $D_i$ where the topic is first discussed in the data stream. After this determination, $D_0$ is set to equal to the determined $D_i$ where the topic is first discussed. Execution then continues with steps as described elsewhere herein.

The presently disclosed invention offers numerous benefits to individuals, associations, and anyone interested in social media network analytics. By means of non-limiting example, individuals interested in a plurality of others' discussions regarding a topic benefit from the presently disclosed invention (including, for example, for personalized event detection, global event detection, or personalized social summary generation, etc.). Businesses or other associations interested in issue resolution, brand promotion, brand monitoring, customer care, product recommendations, retail, ITO, and healthcare, etc. benefit from the advantages presented. Data analysis pursuits such as sentiment analysis, summarization, topic detection, and topic modeling are all achieved. Monitoring of social media streams also provides for more effective engagement with customers, including further brand association.

These and other aspects, objectives, features, and advantages of the disclosed technologies will become apparent from the following detailed description of illustrative embodiments thereof, which is to be read in connection with the accompanying drawings.

BRIEF DESCRIPTION OF THE DRAWINGS

FIG. 6 is a chart 600 displaying words selected by execution of various embodiments of the invention across a number of days.

FIG. 7 is a chart 700 displaying a top representative message in a data stream for each day as selected by an embodiment of the invention.

DETAILED DESCRIPTION

Figure 1:
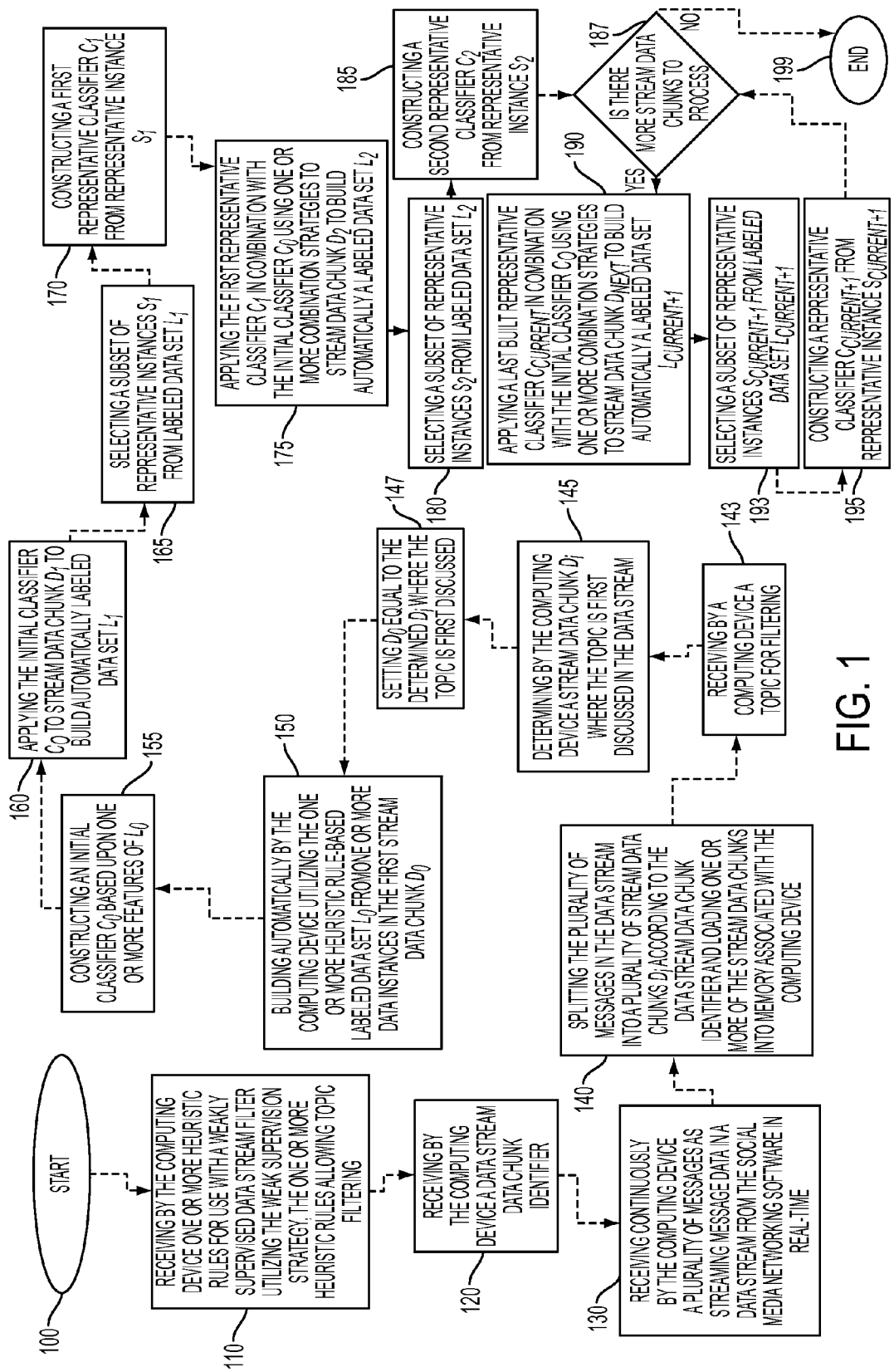
FIG. 1 is a flowchart displaying a process of execution of an embodiment of the invention.

Describing now in further detail these exemplary embodiments with reference to the figures as described herein, the System, Method, and Apparatus for Automatic Topic Relevant Content Filtering From Social Media Text Streams Using Weak Supervision is described below. It should be noted that the drawings are not to scale.

As used herein, certain variables are defined as follows. Variable "$D_i$" denotes a data chunk having index i. In an embodiment of the invention, index i≥0. Variable "$C_0$" denotes an initial classifier. $C_i^R$ for an index of i>0 denotes a representative classifier. Variable "$L_i$" denotes a labeled data set. Index i with regard to the labeled data set $L_i$ denotes the data chunk $D_i$ from which the labeled data set $L_i$ is generated. Variable $E_i$ denotes the ensemble classifier, having index i. In various embodiments of the invention, variables may be implemented as objects, arrays, matrices, linked-lists, one or more spreadsheets, a .csv file, one or more classes, one or more nodes, or any other sort of computer-implemented structure allowing storage of data.

A "computing device," "computer device," "server," "system," and/or "general-purpose computing device," (collectively a "general-purpose computing device") as discussed in the context of this patent application and related patent applications, refers to one or multiple computer processors acting together, similarly a logic device or devices, an embedded system or systems, or any other device or devices allowing for programming and decision making. A "special purpose computing device," or "specialized computing device" (collectively a "specialized computing device") may also be discussed and utilized in an embodiment of the invention, alternately or in combination with the general-purpose computing device (described above), and is a computing device specially built or programmed to perform only a task as discussed herein, or a limited number of tasks. Multiple computer systems with associated computing devices may also be networked together in a local-area network or via the internet to perform the same function, and are therefore also a general-purpose computing device or a specialized computing device, as discussed herein. In one embodiment, a general-purpose computing device or a specialized computing device may be multiple processors or circuitry performing discrete tasks in communication with each other, together performing a specialized function. The system, method, and apparatus described herein are implemented in various embodiments to execute on the general-purpose computing device or the "specialized computing device" or, as is commonly known in the art, such a device specially programmed in order to perform a task at hand. A general-purpose computing device or a specialized computing device, is a necessary element to process the large amount of data (i.e. thousands, tens of thousands, hundreds of thousands, or more of messages transmitted as streaming message data from social media networking software). Furthermore, the present invention may take the form of a computer program product embodied in any tangible medium of expression having computer-usable program code embodied in the medium. Computer program code for carrying out operations of the present invention may operate on any or all of the general-purpose computing device or a specialized computing device, discussed herein. Computer program code for carrying out operations of the present invention may be written in any combination of one or more programming languages, including an object-oriented programming language such as Java, Smalltalk, C++, or the like, conventional procedural programming languages, such as Visual Basic, "C," or similar programming languages. After-arising programming languages are contemplated as well.

Referring to FIG. 1, displayed is a flowchart displaying a process of execution of an embodiment of the invention. Steps 100 through 199 may take place in any order, and all of the steps disclosed may or not may not be performed. Execution begins at step 100. At step 110, the computing device may receive one or more heuristic rules for use with a weakly supervised data stream filter, the one or more heuristic rules allowing topic filtering. In a non-limiting example, the heuristic rule received may be simply to search for keywords such as "bomb" and "Iraq." A received message is therefore relevant if contains the words "bomb" and "Iraq." The "weak supervision" may arise from minimal input by a user (such as, for example, simply inputting a single phrase "bomb" and "Iraq" as with the previously disclosed sample heuristic rule, allowing the presently disclosed system, method, and apparatus to execute till completion and provide the requested results). "Weak supervision" may be generally defined as one in which supervision is not provided in the form of labels for each training example but rather at a global level in the form of heuristic and other rules. Heuristic rules are typically "global" in scope, although in an embodiment of the invention they may be specific rules. Allowing for initial processing according to one or more input heuristic rules (such as an input by a domain expert providing domain knowledge, specifically regarding any particular application being discussed) adds a great deal of flexibility and utility to the presently disclosed invention.

At step 120 the computing device utilizes a data stream data chunk identifier. The data chunk identifier provides the computing device a means by which to identify how a continuously received data stream is to be split into identifiable segments which may be processed in accordance with the presently disclosed system, method, and apparatus. The proposed invention is built keeping the streaming nature of social networking websites in mind, where new data is continuously received and processed during execution. At step 130, the computing device continuously receives a plurality of messages as streaming data in the continuously received data stream from the social media networking software in real-time, as data become available. As in the example of Twitter®, a popular micro-blogging social networking website, users of Twitter® post short messages ("tweets," in the case of Twitter®) in real-time regarding their personal statuses, activities, etc. while also posting regarding current events, news topics, etc. Although only a small fraction of "tweets" are event-related news, the messages present a rich variety of information regarding a plurality of topics of interest to a user of the present invention, continuously feeding new data to process.

At step 140, the plurality of messages in the data stream are split into a plurality of data stream chunks $D_i$, according to the data stream chunk identifier, and then in an embodiment of the invention are loaded into memory associated with the computing device. The data stream chunk identifier may identify data stream chunks according to a timestamp or simply volume of data transmitted from the datastream. If the data stream chunk identifier identifies data stream chunks via timestamp, in various embodiments a minute's worth of data stream, an hour's worth of data stream, a day's worth of data stream, a week's worth of data stream, and a month's worth of data stream may be used to identify a single data stream chunk. Data stream chunks are a necessary element of an embodiment of the invention, allowing capturing of characteristics of the data stream at different times, and since it is not practical to build a single data set for the whole data stream if the data stream is continuously received.

After step 140 execution proceeds to step 143 where a computing device receives a topic for filtering. The computing device may receive the topic for filtering from a human or other software, in various embodiments. The topic received is used by the computing device in an embodiment of the invention to filter out irrelevant data from streaming message data. At step 145, the computing device determines a stream data chunk $D_i$ where the topic is first discussed in the data stream. At step 147, the computing device sets $D_0$ equal to the determined $D_i$ where the topic is first discussed. A starting point for execution of the presently disclosed invention is therefore discovered. In an embodiment of the invention, selecting a starting point as described in steps 143 to steps 147 takes place during other phases of execution of the presently disclosed invention. In other embodiments, the presently disclosed system, method, and apparatus may simply begin execution on the first data received from the data stream.

There are two main reasons for utilization of steps 143 to 147. Firstly, if something emerges from the large volume of a data stream, it means the theme has raised people's attention, further indicating that it is meaningful to study the theme. For instance, by following the steps disclosed, the starting point may be set as a topic just becomes a "trending topic" on the Twitter® news feed. Collected relevant data may thereafter be used in many applications, such as topic tracking, event story generation, etc. Secondly, when the given theme just emerges from the data stream, it indicates the time at which the given theme becomes dominating the data stream. The Initial Classifier $C_0$ built in such situation may best capture the basics of the given theme.

At step 150, the computing device builds automatically using the one or more heuristic rules (or domain knowledge) a rule-based labeled data set $L_0$ from one or more data instances in the first stream data chunk $D_0$. In effect, the computing device is performing a determination of whether or not certain words or other concepts are relevant or not in the first stream data chunk $D_0$, and building a labeled data set $L_0$ for further use. In an embodiment of the invention, each relevant message may be labeled a binary 1 and each non-relevant message labeled a binary 0. One advantage presented by an embodiment of the presently disclosed invention is that it does not use any manually labeled data. The heuristic rules or domain knowledge may be given by a domain expert, then utilized by the computing device to automatically build the rule-based labeled data set $L_0$, without any training data set. At step 155, an initial classifier $C_0$ is built, based upon one or more features of $L_0$. In an embodiment, when constructing the initial classifier $C_0$ based on one or more features of $L_0$, the one or more features are specifically tailored to the social media networking software utilized. At step 160, the initial classifier $C_0$ is applied to stream data chunk $D_1$ to build automatically labeled data set $L_1$. In effect, as the initial classifier $C_0$ is applied, the computing device is performing another determination of whether or not various words or other concepts are relevant or not, and builds a labeled data set $L_1$.

At step 165, a subset of representative instances $S_1$ is selected from labeled data set $L_1$. In an embodiment, when selecting the subset of representative instances, the representative positive instances in $S_i$ are selected from a set of a most reliable labeled data. In an embodiment of the invention, they are also selected based on the sub-topics of the given theme from stream data chunk $D_i$. At step 170, a first representative classifier $C_1$ is constructed by the computing device from representative instance $S_1$ (alternately known herein as a represent(ive) classifier $C_i^R$).

In an embodiment of the invention, selecting of representative labeled data to construct the first representative classifier $C_1$ occurs as displayed in the following pseudocode:

---

Procedure 1: Qualification Criteria Q of Selecting Representative Instances
Input: Labeled data $L_i$ from $D_i$ and corresponding confidence data $Conf_i (i \geq 0)$
Input: #candidate instances = p; #companion words = m; #representative instances = n
Output: Selected representative instances $S_i$ from $L_i$ sorted by relevancy
   → Select companion words
1: $Avg^+(Conf_i)$ ← average confidence value of instances in $L_i^+$
2: $L_i^+$ ← $L_i^+ \cap (Conf_i \geq Avg^+(Conf_i))$
3: $L_i^{C+}$ ← sort $L_i^{+'}$ by correlation descendingly
4: $L_i^{R+}$ ← sort $L_i^{+'}$ by reliability descendingly
5: $L_i^{cand+}$ ← (top-p ($L_i^{C+}$) ∩ top-p ($L_i^{R+}$)) ∪ [(top ($L_i^{C+}$)] → [ ] optional
6: $Comp_i$ ← top-m most frequent words in $L_i^{cand+}$
   → Select anti-topic words
7: $Avg^-(Conf_i)$ ← average confidence value of instances in $L_i^-$
8: $L_i^{-'}$ ← $L_i^- \cap (Conf_i \leq Avg^-(Conf_i))$
9: $L_i^{C-}$ ← sort $L_i^{-'}$ by correlation ascendingly
10: $L_i^{R-}$ ← sort $L_i^{-'}$ by reliability ascendingly
11: $L_i^{cand-}$ ← (top-p ($L_i^{C-}$) ∩ top-p ($L_i^{R-}$)) ∪ [top ($L_i^{C-}$)]
12: $Anti_i$ ← top-m most frequent words in $L_i^{cand-}$
   → Select representative instances and build new dataset
13: $Common_i$ ← $Comp_i \cap Anti_i$ 14:
$$\text{if } \left(\frac{|Common_i|}{|Comp_i|} < 0.5\right) \& \left(... \frac{|Common_i|}{|Anti_i|} < 0.5\right) \text{ then } \rightarrow \text{ check diversity}$$

15: $Comp_i$ ← $Comp_i \cup T$
16: $S_i^+$ ← top-n instances with highest frequency of $Comp_i$ in $L_i^{+'}$
17: $S_i^-$ ← top-n instances with highest frequency of $Anti_i$ in $L_i^{-'}$
18: $S_i$ ← $S_i^+ \cup S_i^-$
19: end if

---

At step 175, the first representative classifier $C_1$ is applied in combination with the initial classifier $C_0$ using one or more combination strategies to stream data chunk $D_2$ to build automatically a labeled data set $L_2$. Since the presently disclosed invention continues to process new stream data chunks $D_i$, "evolvement" of topics may be noted by a user as new stream data chunks become available. After step 175, or at any time during execution of the invention after a representative classifier $C_{i>0}$ has been built, the computing device may build an ensemble classifier $E_i$ that ensembles the initial classifier $C_0$ and a latest built representative classifier $C_{i>0}$. As discussed further herein, other classification combination strategies are contemplated by other embodiments of the invention. The ensemble classifier $E_i$ ensembles classification results of both initial classifier $C_0$ and a latest built representative classifier $C_i^R$. Ensemble classifier $E_i$ may serve three functions, if utilized:

1. Ensemble classifier $E_i$ works as a pre-filter by removing data instances whose labels disagree by two composing classifiers of $E_i$. When processing data stream chunk $D_i$, only data instances classified by the two composing classifiers with the same labels are kept as candidate instances for further relevant filtering and representative data selections. Such representative data instances consist of co-labeled data set of $D_i$, denoted by $L_i^{co}$.
2. For each data instance I in $L_i^{co}$, its confidence of being a relevant data instance is calculated by combining confidence values generated by both of the two composing classifiers in $E_i$, as given by equation below. The two composing classifiers may be given different weights. For instance, if the provided domain knowledge is not very strong, it may be necessary to put more weight on $C_0$ to better maintain the given theme. On the contrary, if $C_0$ captures the given theme very well or there is more interest in the evolution of the topic/event, more weight may be put on $C_i^R$ to better capture sub-topics. The ensemble confidence value will also serve as one of the criteria to selecting representative data (further details provided elsewhere herein).

$$Conf_i(I) = (1-\alpha)*Conf[C_0(I)] + \alpha*Conf[C_i^R(I)]$$

3. Data instance I in co-labeled data of $D_i$ may be defined as a "relevant" data instance by two approaches, either when I is labeled as "relevant" (label=1) by both of the two composing classifiers of $E_i$ or when $Conf_i(I) \geq \mathcal{O}$. The threshold $\mathcal{O}$ may be assigned to different values as well as depend on practical applications. Usually, the larger of the assigned value of $\mathcal{O}$, the higher recall of filtered relevant data. Oppositely, if an application has higher requirement on the "coverage" of the filtered relevant data, a lower value may be set on $\mathcal{O}$.

At step 180, the computing device selects a subset of representative instances $S_2$ from labeled data set $L_2$. In a further embodiment, the representative positive instances which constitute the training data set $S_i (i \geq 1)$ are selected based on "localized" sub-topics of a given theme within $D_i$. If some specific topic T dominates the given theme, the filtering criteria is solely learnt from T. Thus, the given theme might drift the given theme from the original "track" to a new theme over time. Thus, in certain circumstances, in an embodiment it is advantageous to avoid such a drifting situation, and instead of directly utilizing the representative classifier $C_i^R$ on $S_i$ to filter relevant data and further select representative instances from $D_{i+}$, classification may be performed by the initial classifier $C_0$. In an embodiment, the initial classifier $C_0$ may be based on domain knowledge from one or more domain experts with regard to the given theme, without considering any sub-topics. Use of the initial classifier may be used to generate a primitive judgment with regard to relevance for the given theme, allowing capturing of a "main thread" regarding the given theme, regardless of "evolvement" over time.

Figure 2:
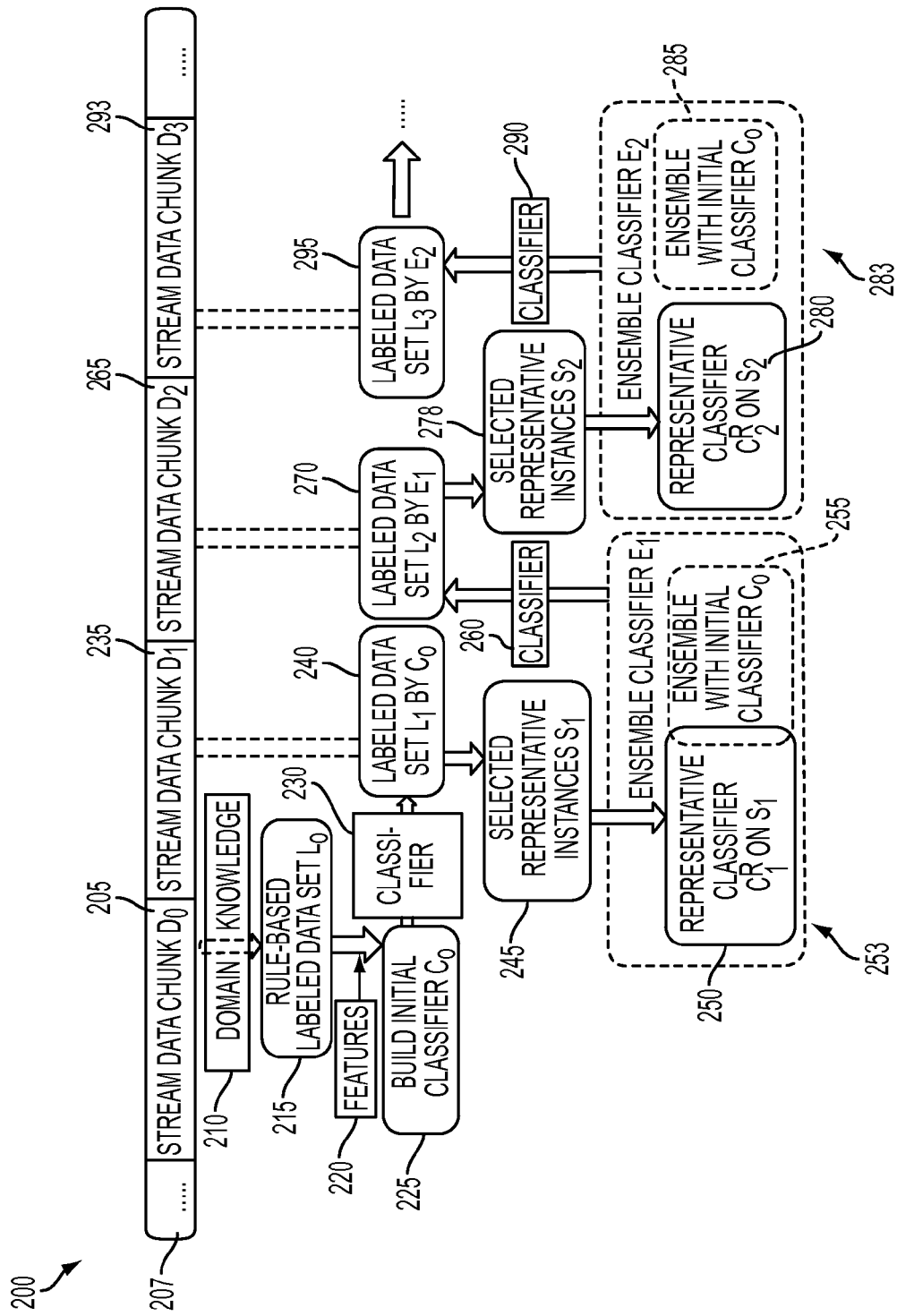
FIG. 2 is a structural diagram 200 displaying interaction of various elements, in an embodiment of the invention.

At step 185, the computing device constructs a second representative classifier $C_2$ from representative instance $S_2$. In an embodiment of the invention, after step 185 at step 187 a determination is made whether there are more stream data chunks to process. If so, execution proceeds to step 190 where a last built representative classifier $C_{current}$ in combination the initial classifier $C_0$ is applied to stream data chunk $D_{next}$ to build automatically a labeled data set $L_{current+1}$. If execution has proceeded directly from step 185 (and has not repeated, as discussed below), $C_{current}=C_2$, $D_{next}=D_3$, and $L_{current+1}=L_3$. Otherwise, as one of skill in the art would know, the required terms will increment themselves by one, as appropriate, from their previous values during execution. At step 193 a subset of representative instances $S_{current+1}$ is selected from labeled data set $L_{current+1}$. At step 195 a representative classifier $C_{current+1}$ is constructed from representative instance $S_{current+1}$. Execution then proceeds, in an embodiment of the invention, back to step 187 where a further determination is made whether there are more stream data chunks to process. If so, execution returns to step 190, with the previously built $C_{current}$ to be applied to a new stream data chunk $D_{next}$, and then again to steps 193 and 195, with a further determination 187 made, etc. Eventually, when there are no more stream data chunks to process, execution proceeds to end 199. In a further embodiment, the computing device may return each message determined to be relevant to the user, FIG. 2 is a structural diagram 200 displaying interaction of various elements during execution, in an embodiment of the invention. At 205 a stream data chunk $D_0$ is processed from the data stream 207. At 210 domain knowledge from a domain expert is received and is used (such as in the form of heuristic rules) to generate a rule-based labeled data set $L_0$ 215. Features 220 extracted from the rule-based labeled data set $L_0$ 215 are used to build an initial classifier $C_0$ 225. At 230 a classifier (here, initial classifier $C_0$) is then applied to stream data chunk $D_1$ 235 to build a labeled data set $L_1$ 240. Selected representative instances $S_1$ 245 are selected from labeled data set $L_1$ 240. A representative classifier $C_1^R$ 250 is constructed from representative instances $S_1$ 245. An ensemble classifier $E_1$ 253 is then built, ensembling the representative classifier $C_1^R$ 250 and the initial classifier $C_0$ 255 (using various classification strategies). A classifier 260 (here, ensemble classifier $E_1$ 253) is then applied to stream data chunk $D_2$ 265, to generate labeled data set $L_2$ 270. Selected representative instances $S_2$ 278 are selected from labeled data set $L_2$ 270. A representative classifier $C_2^R$ 280 is constructed from representative instances $S_2$ 278. An ensemble classifier $E_2$ 283 is then built, ensembling the representative classifier $C_2^R$ 280 (using various classification strategies) and the initial classifier $C_0$ 285. A classifier 290 (here, ensemble classifier $E_2$ 283) is then applied to stream data chunk $D_3$ 293, to generate labeled data set $L_3$ 295. Execution may then continue based upon whether there are more stream data chunks $D_i$ to process and user decision-making (e.g. whether he, she, or it wants execution to terminate).

Figure 3:
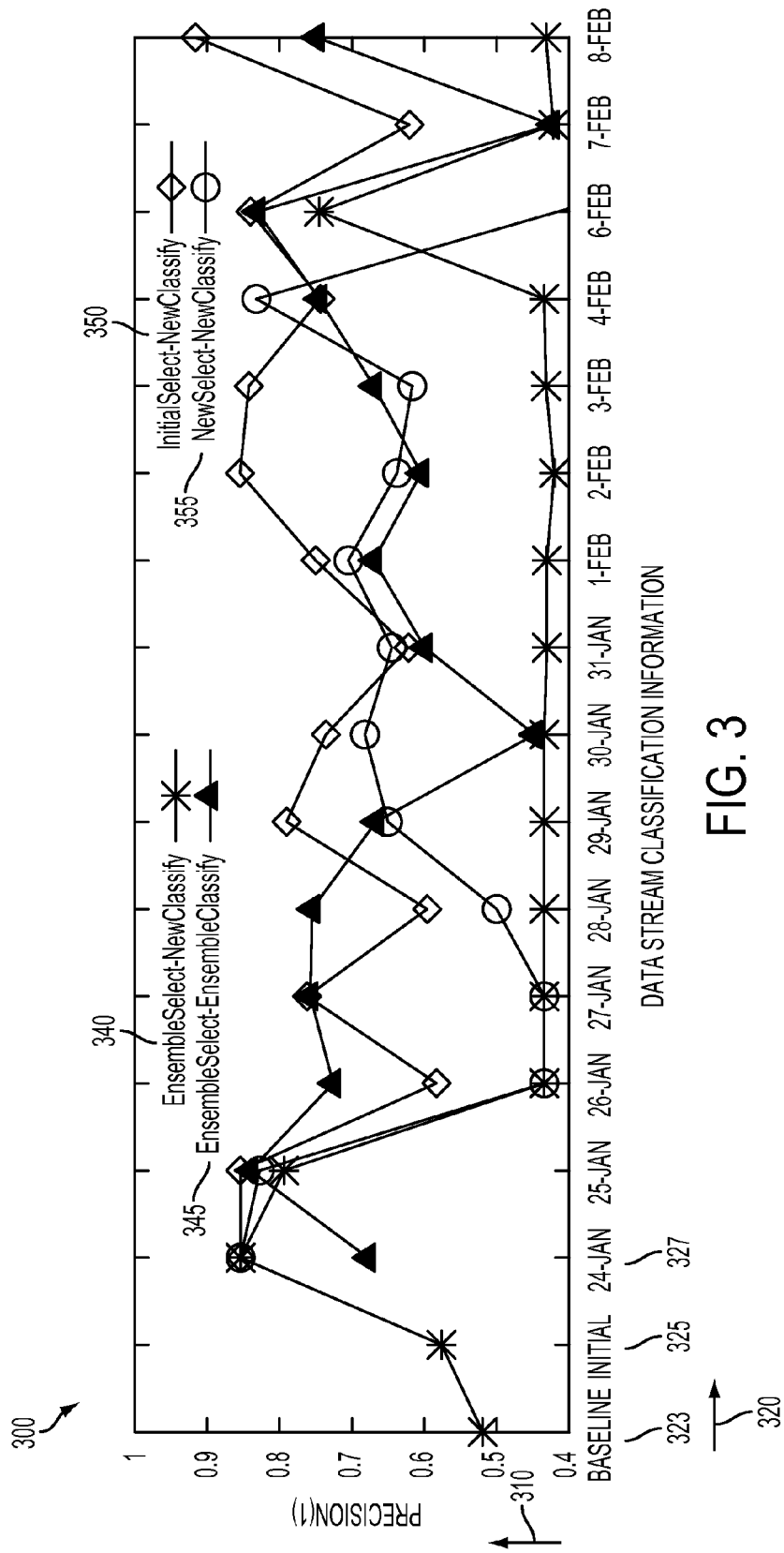
FIG. 3 is a chart 300 displaying results of execution of multiple embodiments of the invention.

FIG. 3 is a chart 300 displaying results of execution of multiple embodiments of the invention. Such a chart 300 may be displayed to a user, systems analyst, or others, allowing rating (and even selection) of different classification combination strategies utilized in various embodiments of the invention. In an embodiment of the invention, for example, when processing data stream data chunk $D_{i+1}$, an ensemble classifier ($E_i$) may be utilized, followed by an initial classifier ($C_0$), followed by a representative classifier ($C_i^R$). After utilization of these steps, a new ensemble classifier ($E_{i+1}$) and new representative classifier ($C_{i+1}^R$) are built. Y-axis 310 of chart 300 describes precision obtained by utilizing various classification combination strategies, in a scale of approximately 0.4 to 1.0. X-axis 320 describes 17 stream data chunk start/end points (i.e. the data stream data chunk identifier), beginning with a baseline 323, followed by results of use of the initial classifier 325, followed by results for January 24 (327), etc. In effect, in the embodiment of the invention a data stream was split into data stream chunks according to "date," specifically one day. Results of using an ensemble classifier ($E_i$), followed by selection of representative instances $S_i$, followed by use of a new representative classifier ($C_{i+1}^R$) are displayed 340, and along the identified associated line. Results of using an ensemble classifier ($E_i$), followed by selection of representative instances $S_i$, followed by a new ensemble classifier ($E_{1+i}$) are displayed 345. Results of using an initial classifier ($C_0$), followed by selection of representative instances $S_i$, followed by a new representative classifier ($C_{i+1}^R$) are displayed 350. Finally, results of using a new representative classifier ($C_i^R$), followed by selection of representative instances $S_i$, followed by another new representative classifier ($C_{i+1}^R$) are displayed 355.

Figure 4:
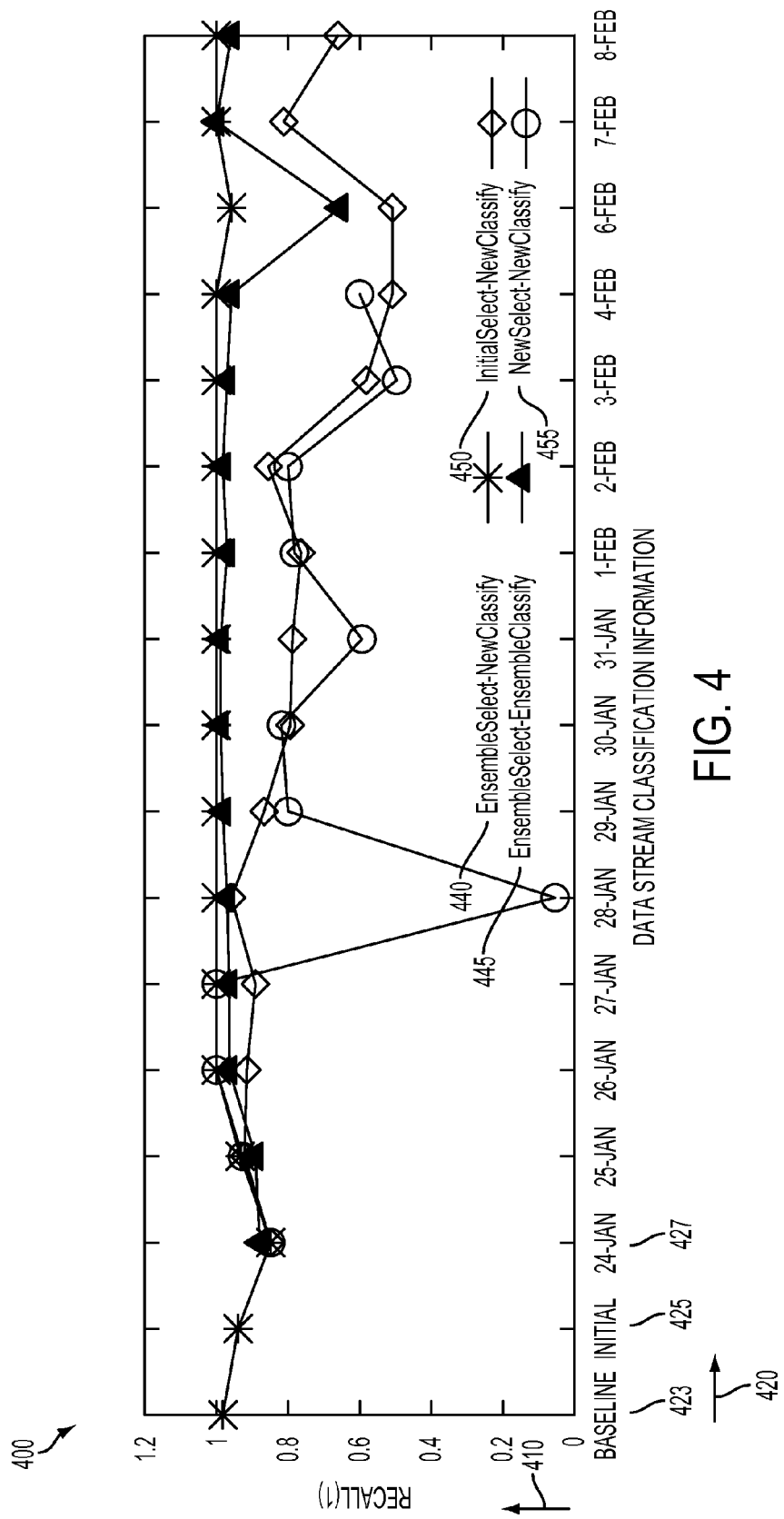
FIG. 4 is a chart 400 displaying results of execution of multiple embodiments of the invention.

FIG. 4 is a chart 400 displaying results of execution of multiple embodiments of the invention. Such a chart 400 (as with chart 300) may be displayed to a user, systems analyst, or others, allowing rating (and even selection) of different classification combination strategies utilized in various embodiments of the invention. Y-axis 410 of chart 400 describes recall obtained by utilizing various classification combination strategies, in a scale of approximately 0.0 to 1.2. X-axis 420 of FIG. 4, as previously with FIG. 3, describes 17 stream data chunk start/end points (i.e. the data stream data chunk identifier), beginning with a baseline 423, followed by results of use of an initial classifier 425, followed by results for January 24 (427), etc. In effect, in the embodiment of the invention a data stream was split into data stream chunks according to "date," specifically one day. Results of using an ensemble classifier ($E_i$), followed by selection of representative instances $S_i$, followed by use of a new representative classifier ($C_{i+1}^R$) are displayed 440, and along the identified associated line. Results of using an ensemble classifier ($E_i$), followed by selection of representative instances $S_i$, followed by a new ensemble classifier ($E_{i+1}$) are displayed 445. Results of using an initial classifier ($C_0$), followed by selection of representative instances $S_i$, followed by a new representative classifier ($C_{i+1}^R$) are displayed 450. Finally, results of using a new representative classifier ($C_i^R$), followed by selection of representative instances $S_i$, followed by another new representative classifier ($C_{i+1}^R$) are displayed 455. A comparison of FIG. 3 baseline 323 and FIG. 4 baseline 423 reveals at baseline high recall value (as with FIG. 4, 423) and low precision value (as with FIG. 3, 323) in these embodiments. This may occur because use of certain heuristic rules during initial stages of execution that classify all messages containing any topical words (as identified by the heuristic rules) as "relevant" and that many false positives are generated in the embodiments described in FIGS. 3 and 4.

Figure 5:
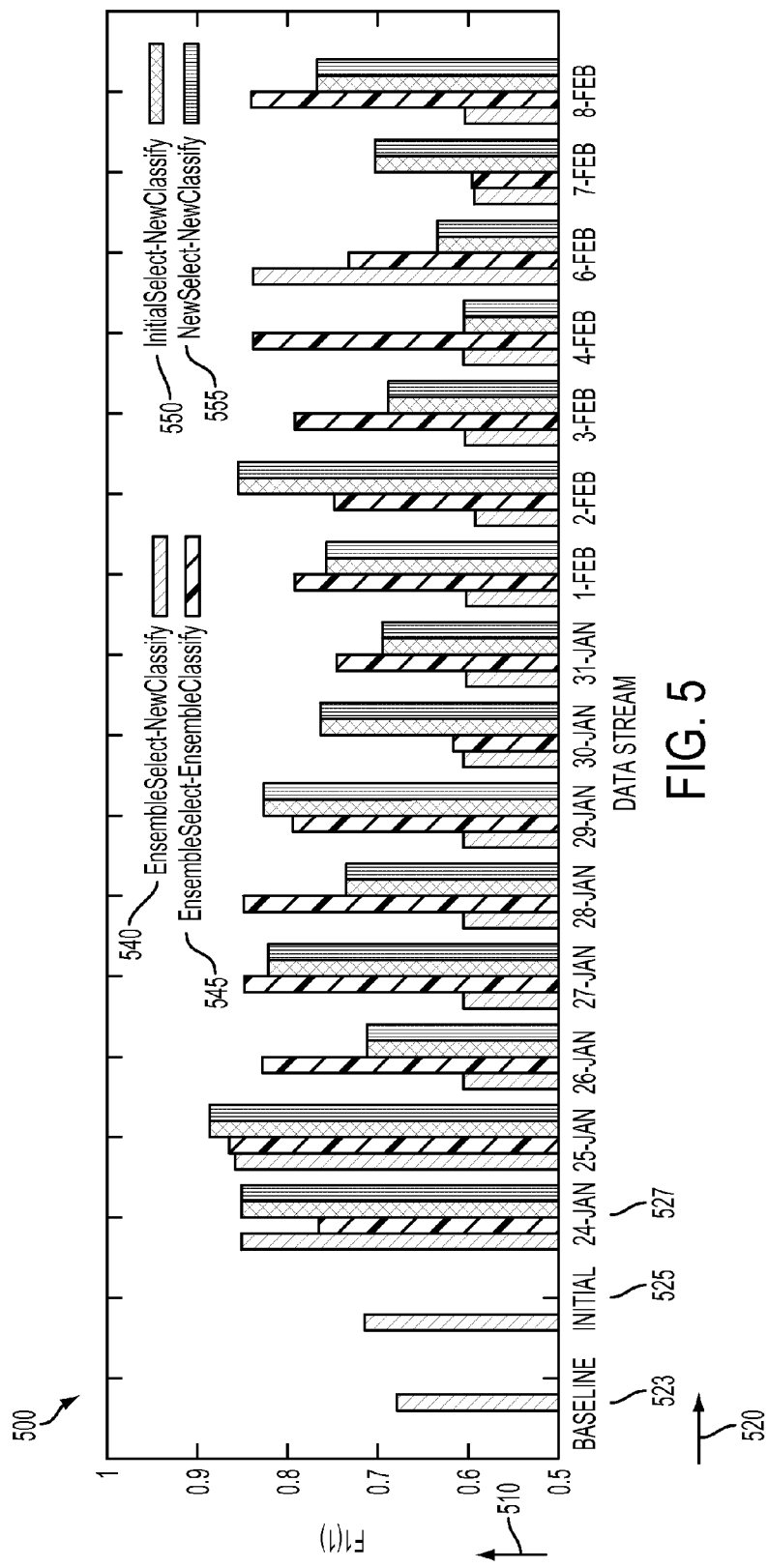
FIG. 5 is a graph 500 displaying a tabulation of obtained results from execution of multiple embodiments of the invention.

FIG. 5 is a graph 500 displaying a tabulation of obtained results from execution of multiple embodiments of the invention. Y-axis 510 displays an "F1" score. The F1 score displayed on y-axis 510 is a harmonic mean of precision 310 and recall 410, previously discussed. X-axis 520 displays, as previously with FIGS. 3 and 4, 17 stream data chunk start/end points (i.e. the data stream data chunk identifier), beginning with a baseline 523, followed by results of use of an initial classifier 525, followed by results for January 24 (527), etc. Results of using an ensemble classifier ($E_i$), followed by selection of representative instances $S_i$, followed by use of a new representative classifier ($C_{i+1}^R$) are displayed 540, and associated identified graph section. Results of using an ensemble classifier ($E_i$), followed by selection of representative instances $S_i$, followed by a new ensemble classifier ($E_{i+1}$) are displayed 545. Results of using an initial classifier ($C_0$), followed by selection of representative instances $S_i$, followed by a new representative classifier ($C_{i+1}^R$) are displayed 550. Finally, results of using a new representative classifier ($C_i^R$), followed by selection of representative instances $S_i$, followed by another new representative classifier ($C_{i+1}^R$) are displayed 555.

Viewing FIGS. 3, 4, and 5 together, it is apparent that for the embodiments disclosed therein, EnsembleSelect-NewClassify results 340, 440, 540 produces similar results as baseline 323, 423, 523 for all stream chunks, i.e. producing very low precision values but very high recall values, while InitialSelect-NewClassify 350, 450, 550 produces exactly the opposite performance. The best results are produced by EnsembleSelect-EnsembleClassify 345, 445, 545 which has relatively high precision and recall values. NewSelect-NewClassify 355, 455, 555 produces only moderate values on both precision and recall. From FIG. 5 it may be determined that EnsembleSelect-EnsembleClassify 545 produces the best results on the most stream chunks, in terms of "F1 score" 510.

FIG. 6 is a chart 600 displaying words selected by execution of various embodiments of the invention across a number of days. Results of utilization of different select options in selection of companion words are displayed, specifically words selected by "Companion words by Ensemble Classifier[,]" (640), "Companion words by Initial Classifier[,]" (650) and "Companion words by New Classifier[,]" (660) are displayed (other than common words selected by all classifiers). "Common companion words" selected by all three classifiers are also displayed 630. Y-axis "ChunkID" 610 is displayed, showing results of different select options, indexed by each day 610. Analysis reveals that at early stages of days described by chart 600 (e.g. January-24 (613) to January-28 (615)), companion words selected share a lot in common. This may be mainly because of a topic still "trending," and because given topical keywords dominate messages during this time. As the topic dies out, selected companion words become more diverse (such as with February-1 (617) to February-6 (619)) by different selection options.

FIG. 7 is a chart 700 displaying a top representative message in a data stream for each day as selected by an embodiment of the invention. Chart 700 displays y-axis "ChunkID" 710, showing different top results of different select options, indexed by each day. Top representative messages 730 may track evolution of given themes over time. FIG. 7 captures the most important and up-to-date information from each data stream data chunk. Top representative messages 730 may be regarded as a summary of a topic. When viewing given topics as an event, the top representative messages 730 may compose a complete story line, therefore in an embodiment of the invention the presently disclosed system, method, and apparatus may be used to generate a sequential summary or event story with regard to a given topic or event, where updates or evolvement are clearly captured.

The preceding description has been presented only to illustrate and describe the invention. It is not intended to be exhaustive or to limit the invention to any precise form disclosed. Many modifications and variations are possible in light of the above teachings.

As will be appreciated by one of skill in the art, the presently disclosed invention is intended to comply with all relevant local, city, state, federal, and international laws and rules.

The preferred embodiments were chosen and described in order to best explain the principles of the invention and its practical application. The preceding description is intended to enable others skilled in the art to best utilize the invention in its various embodiments and with various modifications as are suited to the particular use contemplated. It is intended that the scope of the invention be defined by the following claims.

What is claimed is:

1. A method to filter relevant content from streaming message data streamed across social media networking software to a computing device utilizing a weak supervision strategy, the method comprising the steps of:
   utilizing by the computing device one or more heuristic rules for use with a weakly supervised data stream filter utilizing the weak supervision strategy, the one or more heuristic rules allowing topic filtering;
   utilizing by the computing device a data stream data chunk identifier;
   receiving continuously by the computing device a plurality of messages as streaming message data in a data stream from the social media networking software in real time;
   splitting, utilizing the data stream data chunk identifier, the plurality of messages in the data stream into a plurality of stream data chunks $D_i$ based on a timestamp or volume of data in the data stream;
   loading one or more of the stream data chunks into memory associated with the computing device;
   receiving by the computing device a topic for filtering;
   determining by the computing device a stream data chunk $D_i$ where the topic is first discussed in the data stream;
   setting $D_0$ equal to the determined $D_i$ where the topic is first discussed to identify the determined stream data chunk $D_i$ as first stream data chunk $D_0$;
   building automatically by the computing device utilizing at least one of a plurality of heuristic rules a rule-based labeled data set $L_0$ from one or more data instances in the first stream data chunk $D_0$;
   constructing an initial classifier $C_0$ based upon one or more features of the labeled data set $L_0$;
   applying the initial classifier $C_0$ to stream data chunk $D_1$ to build automatically a labeled data set $L_1$;
   selecting a subset of representative instances $S_1$ from labeled data set $L_1$;
   constructing a first representative classifier $C_1$ from the representative instances $S_1$;
   applying the first representative classifier $C_1$ in combination with the initial classifier $C_0$ using one or more combination strategies to stream data chunk $D_2$ to build automatically a labeled data set $L_2$;
   selecting a subset of representative instances $S_2$ from labeled data set $L_2$; and
   constructing a second representative classifier $C_2$ from the representative instances $S_2$.

2. The method of claim 1, wherein applying the initial classifier $C_0$ or the first representative classifier $C_1$ comprises performing a determination of whether one or more words in the plurality of messages are relevant or not-relevant.

3. The method of claim 2, wherein each relevant message is labeled as 1 and each nonrelevant message is labeled as 0.

4. The method of claim 2, wherein the computing device returns each relevant message to a user.

5. The method of claim 1, wherein the timestamp is based selectively on one or more of the following timeframes: a minute, an hour, a day, a week, and a month.

6. The method of claim 1, wherein when constructing the initial classifier $C_0$ based on one or more features of the labeled data set $L_0$, the one or more features are specially tailored to the social media networking software.

7. The method of claim 1, wherein the computing device builds an ensemble classifier $E_i$ that ensembles the initial classifier $C_0$ and a latest built representative classifier $C_i^R$.

8. The method of claim 1, wherein the computing device selects a subset of representative instances $S_i$ from each built labeled data set $L_i$.

9. The method of claim 8, where i=current+1.

10. A system to filter relevant content from streaming message data streamed across social media networking software to a computing device utilizing a weak supervision strategy, the system comprising a computing device which performs the following:
   utilize one or more heuristic rules for use with a weakly supervised data stream filter utilizing the weak supervision strategy, the one or more heuristic rules allowing topic filtering;

utilize a data stream data chunk identifier;
receipt continuously of a plurality of messages as streaming message data in a data stream from the social media networking software in real-time;
split, utilizing the data stream data chunk identifier, the plurality of messages in the data stream into a plurality of stream data chunks $D_i$ based on a timestamp or volume of data in the data stream;
load one or more of the stream data chunks into memory associated with the computing device;
receive by the computing device a topic for filtering;
determine by the computing device a stream data chunk $D_i$ where the topic is first discussed in the data stream;
set $D_0$ equal to the determined $D_i$ where the topic is first discussed to identify the determined stream data chunk $D_i$ as first stream data chunk $D_0$;
build automatically utilizing at least one of a plurality of heuristic rules a rule-based labeled data set $L_0$ from one or more data instances in the first stream data chunk $D_0$;
construct an initial classifier $C_0$ based upon one or more features of the labeled data set $L_0$;
apply the initial classifier $C_0$ to stream data chunk $D_1$ to build automatically labeled data set $L_1$;
select a subset of representative instances $S_1$ from labeled data set $L_1$;
construct a first representative classifier $C_1$ from the representative instances $S_1$;
apply the first representative classifier $C_1$ in combination with the initial classifier $C_0$ using one or more combination strategies to stream data chunk to build automatically a labeled data set $L_2$;
select a subset of representative instances $S_2$ from labeled data set $L_2$; and
construct a second representative classifier $C_2$ the from representative instances $S_2$.

11. The system of claim 10, wherein the application of the initial classifier $C_0$ or the first representative classifier $C_1$ comprises performing a determination of whether one or more words in the plurality of messages are relevant or not-relevant.

12. The system of claim 11, wherein each relevant message is labeled as 1 and each nonrelevant message is labeled as 0.

13. The system of claim 11, wherein the computing device returns each relevant message to a user.

14. The system of claim 10, wherein the timestamp is based selectively on one or more of the following timeframes: a minute, an hour, a day, a week, and a month.

15. The system of claim 10, wherein when constructing the initial classifier $C_0$ based on one or more features of the labeled data set $L_0$, the one or more features are specially tailored to the social media networking software.

16. The system of claim 10, wherein building an ensemble classifier $E_i$ that ensembles the initial classifier $C_0$ and a latest built representative classifier $C_i^R$.

17. The system of claim 10, wherein the computing device selects a subset of representative instances $S_i$ from each built labeled data set $L_i$.

18. The system of claim 17, where i=current+1.

* * * * *